United States Patent [19]

Beckman

[11] 4,133,659
[45] Jan. 9, 1979

[54] SYSTEM FOR REMOVING POLLUTANTS FROM GASES HAVING INTERNAL BYPASS CAPABILITY

[75] Inventor: Eugene B. Beckman, Rockaway, N.J.

[73] Assignee: Foster Wheeler Energy Corporation, Livingston, N.J.

[21] Appl. No.: 762,212

[22] Filed: Jan. 24, 1977

[51] Int. Cl.² ............................................. B01D 46/42
[52] U.S. Cl. ......................................... 55/314; 55/387; 55/479; 55/484; 55/518
[58] Field of Search .................................. 55/312–314, 55/387, 484, 479, 518, 73, 79

[56] References Cited

U.S. PATENT DOCUMENTS

| | | | |
|---|---|---|---|
| 3,173,980 | 8/1965 | Hysinger | 55/314 X |
| 3,180,712 | 4/1965 | Hamblin | 55/314 X |
| 3,267,648 | 8/1966 | Allcorn, Jr. | 55/314 X |
| 3,712,030 | 1/1973 | Priest | 55/313 X |
| 3,717,976 | 2/1973 | Gappa et al. | 55/73 |
| 3,815,335 | 6/1974 | Barnebey | 55/484 X |
| 3,964,890 | 6/1976 | Bonn | 55/484 X |

FOREIGN PATENT DOCUMENTS 221128 12/1921 Fed. Rep. of Germany ............. 55/314

Primary Examiner—William A. Cuchlinski, Jr.
Attorney, Agent, or Firm—Marvin A. Naigur; John J. Herguth; Warren B. Kice

[57] ABSTRACT

A system for removing pollutants from gases in which one or more beds of activated char are formed in a housing along with passages for permitting the passage of the gases directly from the housing inlet to the outlet and passages for permitting passage of the gases from the inlet across the beds of activated char to the outlet. Damper means are associated with the first mentioned passages and are movable from an open position in which the gases pass through the first passages and a closed position in which the gases are directed through the second passages.

8 Claims, 13 Drawing Figures

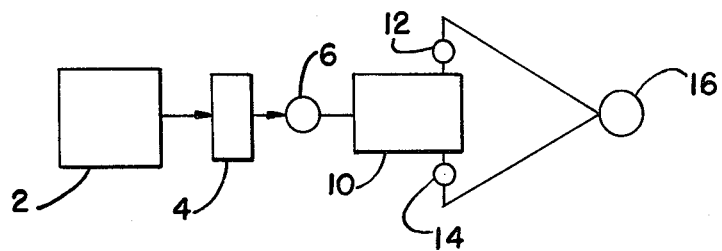
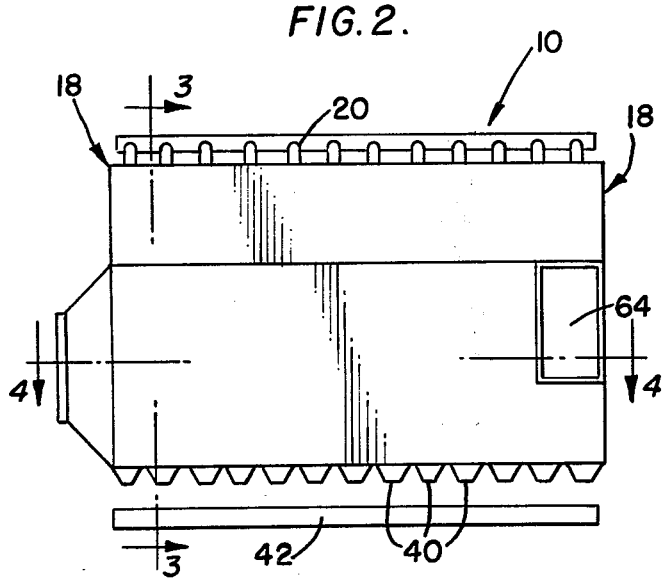
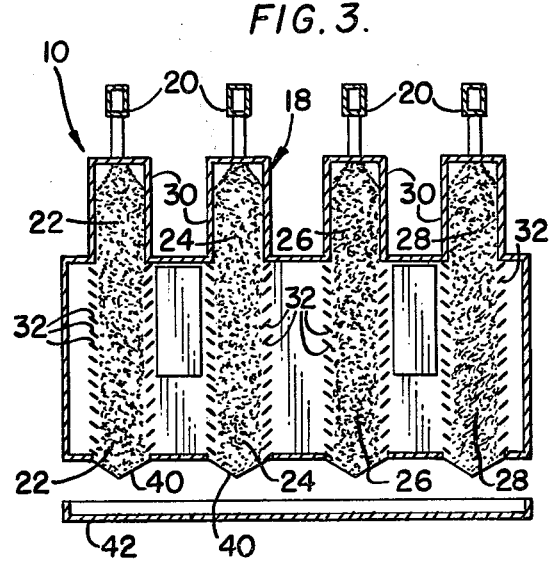
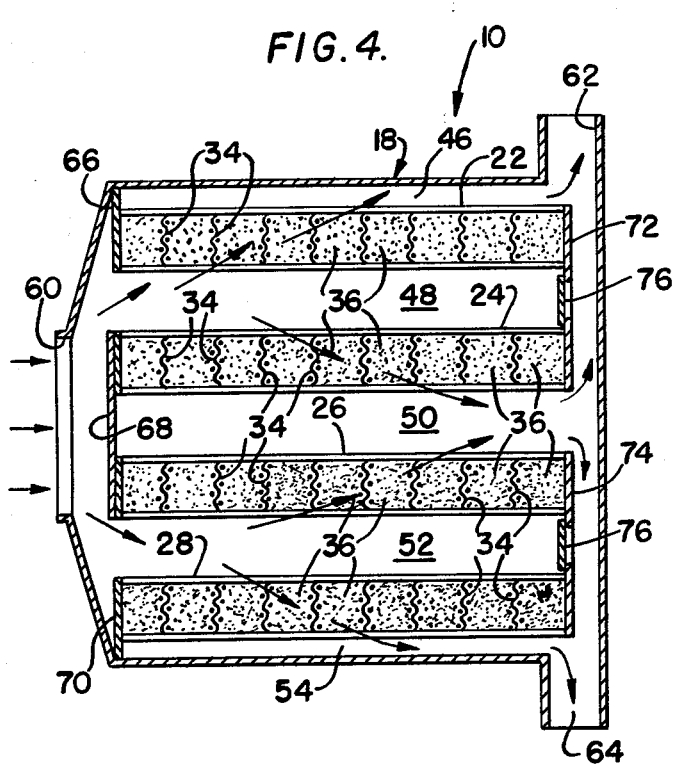
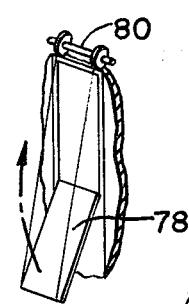
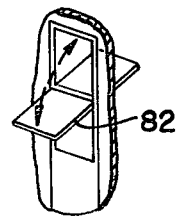
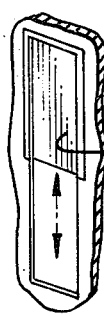
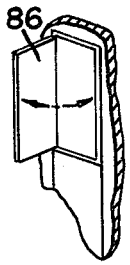
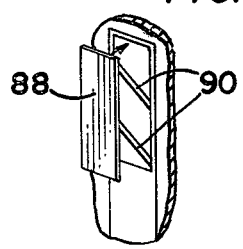

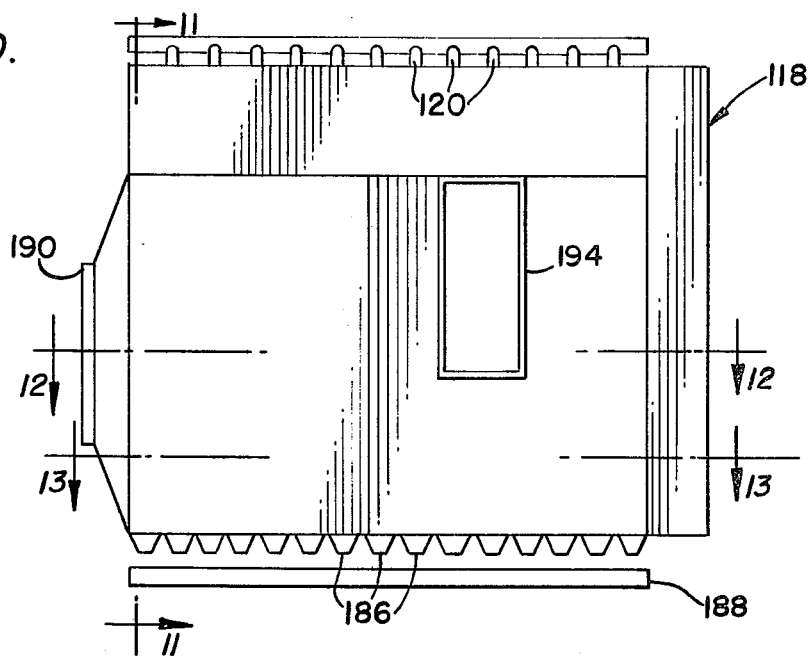
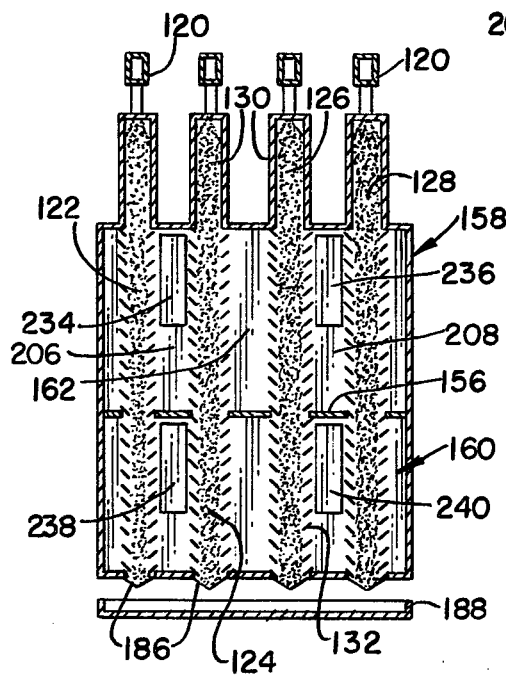
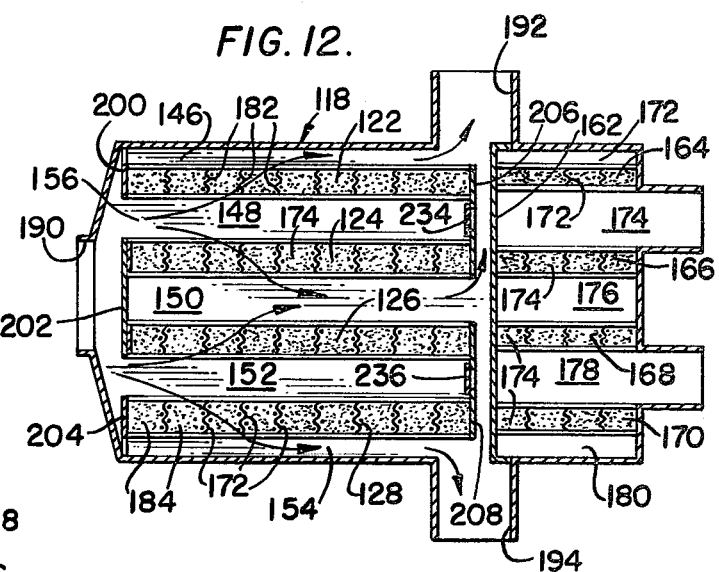
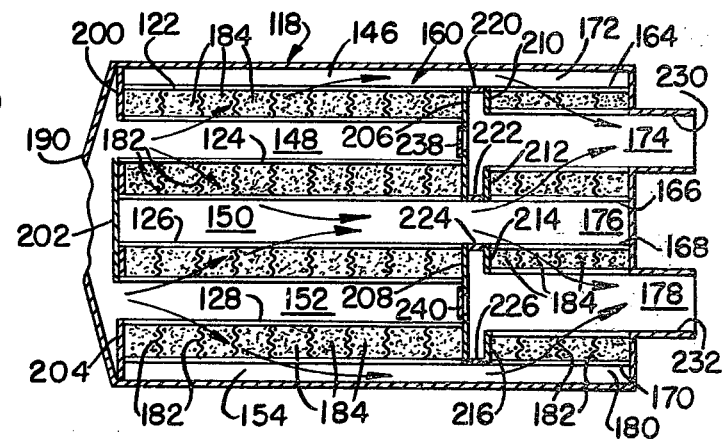

SYSTEM FOR REMOVING POLLUTANTS FROM GASES HAVING INTERNAL BYPASS CAPABILITY

BACKGROUND OF THE INVENTION

This invention relates to the removal of pollutants from gases and more particularly to an adsorber system in which pollutant laden gases are passed through columns of activated char to adsorb the sulfur oxides from the gases into the char pellets.

The technique of adsorbtion to remove sulfur oxides from pollutant laden gases, such as flue gases from a fossil fuel boiler, is well known. According to this basic process, an adsorber is provided which receives the gases and includes a bed of activated char located in the path of the gases. As a result, the $SO_2$, oxygen and water vapor in the gases come into contact with and are adsorbed by the char pellets. The $SO_2$ in the gases is oxidized to $SO_3$ and subsequently catalytically converted to sulfuric acid which is held in the interior pore system of each char pellet. The substantially pollutant-free gases are then passed to a stack, or the like, for exhaustion into the atmosphere.

The adsorber usually contains one or more vertical beds of activated char which moves downwardly in mass flow while adsorbing the pollutants from the gases. The upper portion of the char bed is continuously replenished while the saturated char is collected at the bottom and sent by conveyors to other sections of the system. For example, the saturated char can be sent to a regenerator for regenerating the saturated char by thermal or wet regeneration to reverse the reactions taking place in the adsorber and produce a concentrated steam of $SO_2$, $H_2O$, $CO_2$, and $N_2$. The stream of $SO_2$ can then be further treated to produce relatively pure sulfur.

In these type of arrangements precautions must be taken to insure a steady flow of the gases from the boiler directly to the stack in the event of a malfunction of either the adsorber section, the regeneration section, or the additional section utilized for further treatment of the sulfur gases. In some arrangements the adsorber is generally placed in a gas flow circuit extending parallel to the main circuit connecting the boiler to the stack and dampers and bypass lines are used to selectively route the gases to the adsorber or directly to the stack. This of course requires additional, rather elaborate, ducting along with dampers, fans, and other associated components to achieve the system design requirements. In addition to being costly these type of arrangements are cumbersome and require a relatively large amount of additional components and labor to assemble them.

SUMMARY OF THE INVENTION

It is therefore an object of the present invention to provide an adsorber for removing pollutants from gases which is especially adapted to be connected directly in the gas flow line between the boiler and the stack.

It is a further object of the present invention to provide an adsorber of the above type which includes an internal circuitry for enabling direct passage of the gases from the boiler to the stack in the event of malfunction of the adsorber or any of the associated units in the circuit.

It is a further object of the present invention to provide an adsorber of the above type in which two stages of adsorbtion are achieved in order to insure uniform adsorbtion efficiency.

It is a still further object of the present invention to provide a system for processing pollutant laden gases including an adsorber of the above type.

Toward the fulfillment of these and other objects the adsorber of the present invention comprises a housing having inlet means for receiving said gases and outlet means for discharging said gases. At least one bed of activated char is disposed in the housing along with one or more passages for permitting flow of the gases directly from the inlet to the outlet. An additional passage is also provided in the housing for permitting flow of the gases from the inlet, across the bed of activated char and to the outlet. Damper means are associated with the first passage and are movable from an open position in which the gases flow through the first passage and a closed position in which the gases are directed through the additional passage.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings wherein:

FIG. 1 is a schematic block diagram of a portion of a power plant utilizing the system of the present invention;

FIG. 2 is a front elevational view of the housing of the system of the present invention;

FIGS. 3 and 4 are cross sectional views taken along the lines 3—3 and 4—4 respectively of FIG. 2;

FIGS. 5–9 are pictorial views depicting several alternate damper arrangements utilized in the system of the present invention;

FIG. 10 is a view similar to FIG. 2 but showing an alternate embodiment of the system of the present invention; and FIGS. 11, 12 and 13 are cross sectional views taken along the lines 11—11, 12—12, and 13—13 respectively of FIG. 10.

DESCRIPTION OF THE PREFERRED EMBODIMENTS

Referring specifically to FIG. 1 of the drawings the reference numeral 2 refers in general to a source of pollutant laden gases which source may be in the form of a fossil fuel fired boiler utilized in steam generating equipment, process plants, or the like. The flue gases exiting from the boiler 2 are passed into a precipitator, or dust collector, 4 for separating the particulate matter from the gases after which the gases are drawn by a fan 6 into an adsorber unit 10 emboding features of the present invention. Two exit fans 12 and 14 are associated with corresponding outlets provided in the side walls of the adsorber unit 10 and direct the gases to a stack 16. Although not specifically described above, it is understood that a suitable flow circuit, including the necessary ducting, piping, etc. connects the boiler 2 to the stack 16 with the precipitator 4 and adsorber 10 being directly connected in a series flow relationship in said circuit.

The absorber unit 10 is depicted in particular in FIGS. 2–4, and includes a housing 18 of suitable refactory material, or the like, having a plurality of feeders 20 disposed on the upper portion thereof for receiving coal from a source (not shown) and directing same into the upper portions of a plurality of vertical columns 22, 24, 26 and 28 located within the housing. The upper portions of the side walls of the columns 22–28 are defined by surge sections 30 (FIG. 3) formed in the upper portion of the housing 18, and the remaining portions of the side walls are formed by a plurality of parallel louvers 32. The louvers 32 are sized and placed at optimum inlet and outlet angles to maintain a bed of coal therein yet permit the flow of gases therethrough, as will be described in detail later.

As better shown in FIG. 4, a plurality of sheets 34 of a mesh-like material are provided at spaced intervals along each column 22–28 to subdivide the latter into a plurality of beds 36, each of which receives the coal from a corresponding distributor 20. An outlet 40 (FIGS. 2 & 3) is associated with each bed 36 and discharges the burned coal into a collection trough 42 for further treatment, such as the regeneration step described above. It is understood that the coal is continuously introduced into the upper portion of the beds 36 where, after initial ignition, it continuously combusts and is maintained in an activated state before discharging from the outlets 40 into the trough 42.

As shown in FIG. 4, the columns 22 and 28 are spaced slightly from the corresponding side walls of the housing 18, and each of the columns 22, 24, 26 and 28 extend in a spaced, parallel relationship. As a result a passage 46 is defined between the column 22 and adjacent side wall of the housing 18, a passage 48 is defined between the column 24 and the column 22, a passage 50 is defined between the column 26 and the column 24, a passage 52 is defined between the column 28 and the column 26, and a passage 54 is defined between the column 28 and the adjacent side wall of the housing 18.

An inlet 60 is formed in the housing 18 at one end thereof and two outlets 62 and 64 are formed in the side walls of the housing 18 adjacent the other end thereof. The columns 22–28 are spaced inwardly from the respective end walls of the housing 18 to permit the passage of the gases from the inlet 60 to the various passages 46–54, and from the latter to the outlets 62 and 64, as will be described later.

As also shown in FIG. 4 a vertical partition 66 is formed in the housing 18 and extends across the end of the column 22 adjacent the inlet 60, and across the passage 46 to block direct flow of gases therethrough. In a similar manner a vertical partition 68 is formed across the ends of the columns 24 and 26 adjacent the inlet 60 and across the passage 50, and a vertical partition 70 extends across the end of the column 28 adjacent the inlet 60 and across the passage 54 also to block the direct flow of gases through these columns and passages. In a similar manner, a vertical partition 72 is provided which extends across the other ends of the columns 22 and 24 and the passage 48, and a vertical partition 74 extends across the other ends of the columns 26 and 28 and the passage 52, also to block the direct flow of gases from these columns and passages to the outlets 62 and 64.

A damper unit 76 is associated with the partitions 72 and 74 for controlling the flow of gases therethrough, and alternate embodiments of the unit are shown in detail with reference to FIGS. 5–9. In particular, the damper unit of FIG. 5 includes a single damper plate 78 which is hinged relative to the partition, and which can be moved by a wire hoist 80 from an open position in which a corresponding opening formed in the partition is exposed, to a closed position. According to the embodiment of FIG. 6, a damper plate 82 is provided which is of a dual-leaf configuration pivotably mounted relative to the partition and adapted to swing from a open horizontal position as shown, to a closed vertical position.

The damper unit of FIG. 7 consists of a vertically extending damper plate 84 which slides in the supporting structure of the partition from an upper open position to a lower closed position. According to the embodiment of FIG. 8 the damper unit is formed by a hinged plate 86 which swings from the open position shown to a closed position. In the embodiment of FIG. 9, the damper unit includes a damper plate 88 supported relative to a corresponding opening in the partition by connectors 90 to permit opening and closing of the plate. It is understood that any one of the damper units depicted in FIGS. 5–9 can be associated with the partitions 72 and 74 in the adsorber 10.

In operation the damper units 76 are normally positioned in their closed position and the partitions 72 and 74, as well as the partitions 66, 68 and 70, thus direct the gases into the passages 48 and 52, across the columns 22, 24, 26 and 28 of activated char, and to the passages 46, 50 and 54 from which they exit from the outlets 62 and 64 as shown by the flow arrows in FIG. 4. In this manner, the sulfur oxides in the gases are adsorbed on the char pellets in each of the beds 36 to substantially reduce the sulfur content in the gases exiting from the outlets 62 and 64 and to the stack 16.

In the event of a malfunction of the absorber 10 or any ancillary equipment connected to same, the damper units 76 can be opened which permits a direct flow of the gases from the inlet 60, through the passages 48 and 52 and the outlets 62 and 64 to the stack 16, thereby bypassing the beds 36 of char.

An alternate embodiment of the adsorber of the present invention is shown by the reference number 116 in FIGS. 10–13 and includes a housing 118 of suitable refactory material, or the like, having a plurality of feeders 120 disposed on the upper portion thereof for receiving coal from a source (not shown) and directing same into the upper portions of a plurality of vertical columns 122, 124, 126 and 128 located within the housing. The upper portions of the side walls of the columns 122–128 are defined by surge sections 130 (FIG. 11) formed in the upper portion of the housing 118, and the remaining portions of the side walls are formed by a plurality of parallel louvers 132 sized and located as in the previous embodiment.

As shown in FIG. 12, the columns 122 and 128 are spaced slightly from the corresponding side walls of the housing 118, and each of the columns 122, 124, 126 and 128 extends in a spaced, parallel relationship. As a result, a passage 146 is defined between the column 122 and adjacent side wall of the housing 118, a passage 148 is defined between the column 124 and the column 122, a passage 150 is defined between the column 126 and the column 124, a passage 152 is defined between the column 128 and the column 126, and a passage 154 is defined between the column 128 and the adjacent side wall of the housing 118.

According to a particular feature of this embodiment, a horizontal partition 156 is provided in the housing 118 as better shown in FIG. 11 to divide a portion of the latter into an upper chamber 158 and a lower chamber 160. The partition 156 extends from the front end wall of the housing 118 to a vertical wall 162 located adjacent the columns 122-128 and extending from the upper portion of the housing to the partition 156.

As better shown in FIG. 12 an additional series of vertical columns 164, 166, 168 and 170 are located within the housing 118 and extend between the wall 162 and the rear wall of the housing. The upper portions of the side walls of the columns 164-170 are defined by additional surge sections 130 formed in the upper portion of the housing 118, and the remaining portions of the side walls are formed by a plurality of parallel louvers 132, as discussed above.

The columns 164 and 170 are spaced slightly from the corresponding side walls of the housing 118, and each of the columns 164, 166, 168 and 170 extend in a spaced, parallel relationship. As a result a passage 172 is defined between the column 164 and adjacent side wall of the housing 118, a passage 174 is defined between the column 166 and the column 164, a passage 176 is defined between the column 168 and the column 166, a passage 178 is defined between the column 170 and the column 168, a passage 180 is defined between the column 170 and the adjacent side wall of the housing 118.

A plurality of sheets 182 of a mesh-like material are provided at spaced intervals along each column 122-128 and 164-170 to subdivide the latter into a plurality of beds 184, each of which receives the coal from a corresponding distributer 120. A coal outlet 186 (FIGS. 10 and 11) is associated with each bed 184 and discharges the burned coal into a collection trough 188 for further treatment, such as the regeneration step described above. It is understood that the coal is distributed and burned in an identical manner to the coal in the previous embodiment.

A gas inlet 190 is formed in the housing 118 at one end thereof and communicates with both the upper chamber 158 and the lower chamber 160. Two outlets 192 and 194 are formed in the side walls of the housing 118 adjacent the vertical wall 162. The columns 122-128 are spaced inwardly from the front end wall of the housing 118 and from the wall 162 to permit passage of the gases in the upper chamber 158 from the inlet 190 through the various passages 146-154, and from the latter to the outlets 192 and 194, as will be described in detail later.

As also shown in FIG. 12, a vertical partition 200 is formed in the housing 118 and extends across the end of the column 122 adjacent the inlet 190 and across the passage 146 to block the direct flow of gases therethrough. In a similar manner a vertical partition 202 is formed across the ends of the columns 124 and 126 adjacent the inlet 190 and across the passage 150, and a vertical partition 204 extends across the end of the column 128 adjacent the inlet 190 and across the passage 154 also to block the direct flow of gases through these columns and passages. Also, a vertical partition 206 is provided which extends across the other ends of the columns 122 and 124 and the passage 148, and a vertical partition 208 extends across the other ends of the columns 126 and 128 and the passage 152, also to block the direct flow of gases from these columns and passages to the outlets 192 and 194.

Each of the partitions 200-208 extends from the upper portion of the housing 118 to the lower portion thereof for the height of the upper and lower chambers 158 and 160. Also, as shown in FIG. 13, in the lower chamber 160 a plurality of partitions 210, 212, 214 and 216 are located immediately below the wall 162 and extend over the end of the columns 164, 166, 168 and 170, respectively. Also in the lower chamber 160, a partition 220 extends across the space between the columns 122 and 164, a partition 222 extends across the space between the columns 124 and 166, a partition 224 extends across the space between the columns 126 and 168 and a partition 226 extends across the space between the columns 128 and 170.

A pair of outlets 230 and 232 are formed in the housing 118 in communication with the passages 174 and 178 in the lower chamber 160. As a result of the above arrangement of inlets, outlets, passages and partitions, gas flow in the lower chamber 160 under normal conditions is shown by the flow arrows in FIG. 13 and will be described in detail later.

As shown in FIGS. 11 and 13 a pair of damper units 234 and 236 are formed in the upper portions of the partitions 206 and 208, and at the end of the upper portions of the passages 148 and 152, respectively to control the flow of gases through the upper chamber 158, and a pair of damper units 238 and 240 are formed in the lower portions of the partitions 206 and 208, and at the end of the lower portion of the passages 148 and 152 respectively, to control the flow of gases through the lower chamber 160.

The damper units 234, 236, 238 and 240 can be of the same type as described in the previous embodiment, i.e., they can take any of the alternate forms depicted in FIGS. 5-9.

In operation of the embodiment of FIGS. 10-13, the damper units 234-240 are normally positioned in their closed position. A portion of the gases entering the inlet 190 of the housing 118 pass into the upper chamber 158 where the partitions 200-208 direct the gases into the passages 148 and 152, across the columns 122-128 of activated char, and to the passages 146, 150 and 154 before they impinge against the vertical wall 162 and are directed to the outlets 192 and 194, as shown by the flow arrows in FIG. 12.

The remaining portion of the gases entering the housing 118 pass into the lower chamber 160 where they are directed in the same manner as discussed above until they leave the outlet ends of the passages 146, 150 and 154. At this point they pass into the passages 172, 176 and 180 in the rear portion of the housing as shown by the flow arrows in FIG. 13 from which they are directed across the columns 164-170 of activated char before exiting from the housing 118 via the passages 174 and 178 and the outlets 230 and 232.

As a result, the gases passing through the lower chamber 160 of the housing 118, are subjected to an additional adsorption by the char in the columns 164-170. This is to compensate for the reduction in adsorption that takes place in the lower portions of the columns 122-128 due to the fact that the coal in the later portions is less active.

In the event of a malfunction of the adsorber or any ancillary equipment connected to same, the damper units 234-240 can be opened which permits a direct flow of the gases in the upper chamber 158 from the inlet 190 through the passages 148 and 152 and the outlets 192 and 194 to the stack 16, therby bypassing the bed 172 of char. Also, a direct flow of gases occurs in the lower chamber 160 through the passage 148 to the passage 174 and through the outlet 230 to the stack 16, and through the passage 152 to the passage 178 and through the outlet 232 to the stack.

It is thus seen that the arrangement of the present invention provides an effective means of adsorbing the pollutants from the gases in an efficient manner, yet enables the adsorption beds to be bypassed to provide a direct flow of gases from the inlet to the various outlets.

It is understood that several variations may be made in the foregoing without departing from the scope of the invention. For example, the number of columns of beds and corresponding gas flow passages can be changed in accordance with particular design requirements.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A system for adsorbing pollutants from gases comprising a housing having inlet means for receiving said gases and outlet means for discharging said gases, a horizontal baffle disposed in said housing and defining an upper adsorbing chamber and a lower adsorbing chamber in said housing, means within the interior of said housing for receiving a first series of beds of adsorbent activated char, said beds being formed in a plurality of vertically extending rows each extending through said upper chamber and said lower chamber, means within the interior of said housing for receiving a second series of beds of adsorbent activated char, first passage means formed within said housing for permitting passage of said gases directly from said inlet means to said outlet means, second passage means formed in said housing for permitting passage of said gases in said upper adsorbing chamber from said inlet means, across said first series of beds of activated char and to said outlet means, third passage means formed in said housing for permitting passage of said gases in said lower adsorbing chamber from said inlet means, across said first and second series of beds of activated char and to said outlet means, and damper means disposed in said housing for selectively directing said gases through said passage means.

2. The system of claim 1, wherein said outlet means includes at least one outlet opening extending through said housing and communicating with said first and second passage means and at least one outlet opening extending through said housing and communicating with said first and third passage means.

3. The system of claim 2, wherein said damper means are movable between an open position in which said gases pass through said first passage means, and a closed position in which the gases are directed through said second and third passage means.

4. The system of claim 2, wherein there are two pairs of beds of activated char all disposed in a spaced parallel relationship in said upper and lower adsorbing chambers, with the beds adjacent the sidewalls of said housing being disposed in a spaced relation to their respective sidewalls, said passage means being defined in the spaces between adjacent beds and in the spaces between said sidewalls and the beds adjacent said sidewalls.

5. The system of claim 4, wherein said first passage means is defined in the spaces between the beds of each pair in said upper and lower adsorbing chambers, and wherein said second and third passage means are defined in the spaces between said sidewalls and the beds adjacent said sidewalls and in the space between said pairs of beds.

6. The system of claim 1, wherein said second series of beds are formed in plurality of vertically extending rows each extending through said upper chamber and said lower chamber.

7. The system of claim 6, wherein said third passage means permits passage of gases through said second series of beds in said lower and upper adsorbing chambers.

8. The system of claim 1, further comprising a feeder means for receiving said char from a source and directing said char to said bed receiving means, and an outlet associated with said bed receiving means for discharging said char from said bed receiving means.

* * * * *